United States Patent
Maw (10) Patent No.: US 11,727,005 B2
(45) Date of Patent: Aug. 15, 2023

(54) FILL IN THE BLANKS WORD COMPLETION SYSTEM

(71) Applicant: Cubic Design Studios LLC, Boise, ID (US)

(72) Inventor: Wai-Lin Maw, Edmonton (CA)

(*) Notice: Subject to any disclaimer, the term of this patent is extended or adjusted under 35 U.S.C. 154(b) by 201 days.

(21) Appl. No.: 16/782,037

(22) Filed: Feb. 4, 2020

(65) Prior Publication Data

US 2020/0175009 A1  Jun. 4, 2020

Related U.S. Application Data

(63) Continuation-in-part of application No. 13/807,730, filed on Mar. 5, 2013, now Pat. No. 10,664,454.

(51) Int. Cl.
*G06F 16/00* (2019.01)
*G06F 16/2455* (2019.01)
*G06F 3/0488* (2022.01)
*G06F 3/0481* (2022.01)
*G06F 40/186* (2020.01)

(52) U.S. Cl.
CPC ........ *G06F 16/2455* (2019.01); *G06F 3/0481* (2013.01); *G06F 3/0488* (2013.01); *G06F 40/186* (2020.01)

(58) Field of Classification Search
CPC .. G06F 3/0482; G06F 40/186; G06F 3/04842; G06F 3/0481; G06F 3/04886; G06F 3/04847; G06F 40/274; G06F 16/2455; G06F 3/0488
See application file for complete search history.

(56) References Cited

U.S. PATENT DOCUMENTS

| | | | | |
|---|---|---|---|---|
| 5,926,652 | A * | 7/1999 | Reznak | G06F 16/90344 712/300 |
| 6,169,999 | B1 * | 1/2001 | Kanno | G06F 40/242 715/255 |
| 6,408,266 | B1 * | 6/2002 | Oon | G06F 40/274 704/1 |
| 7,277,029 | B2 * | 10/2007 | Thiesson | G06F 40/274 341/22 |
| 7,706,616 | B2 * | 4/2010 | Kristensson | G06K 9/222 382/187 |
| 2003/0236783 | A1 * | 12/2003 | Eminovici | G06F 16/90344 |

(Continued)

FOREIGN PATENT DOCUMENTS

| | | |
|---|---|---|
| CN | 101452458 | 6/2009 |
| CN | 101546226 | 9/2009 |

*Primary Examiner* — Debbie M Le (57) ABSTRACT

A word completion system based on a partial but exact template that entails a finite number of matches. A primary component is a close ended template made up of cues representing one or more characters, constrained by the exact number of characters in the desired word. It can be edited with pinpoint accuracy to regenerate a new result set in real time to reflect the change. The exact number of characters in the template can be indicated by a discrete signal with a designated gesture or keying in a number. The system is substantially interactive without requiring command line input or a scripting language. A delimiter or a designated signal is used to select an entry from the result set to complete the target word. The proposed method is inherently deterministic and extensible to different writing systems, and adaptable and portable to a wide range of hardware platforms.

20 Claims, 6 Drawing Sheets

(56) References Cited

U.S. PATENT DOCUMENTS

| | | | |
|---|---|---|---|
| 2005/0169527 A1* | 8/2005 | Longe | G06F 3/04886 382/177 |
| 2007/0168469 A1* | 7/2007 | Church | G06F 40/232 709/219 |
| 2010/0100515 A1* | 4/2010 | Bangalore | G06F 40/186 706/46 |

* cited by examiner

FILL IN THE BLANKS WORD COMPLETION SYSTEM

CROSS REFERENCE TO RELATED APPLICATIONS

This continuation in-part application of U.S. Ser. No. 13/807,730 claim the benefits of provisional application U.S. 61/369,235 filed Jul. 30, 2010, and is related to regular application U.S. Ser. No. 11/194,788 filed Aug. 1, 2005, and international application PCT/US2005/027272 filed Aug. 1, 2005.

BACKGROUND

Word completion systems, also known as word prediction, auto complete or typing assistant, are commonly used on mobile devices due to the difficulty of typing on small keyboards. Currently available systems can be categorized into alphabetical and graphical.

The alphabetical word completion systems try to predict the desired word from the first few letters typed, but suffers from the lack of accuracy in defining the initial template.

The graphical word completion systems use the trace path across the touch screen keyboard as a template, but suffer from the ambiguity of the trace path and the dependency of a touch screen interface.

Both of these approaches are designed primarily for alphabetical or segmental writing systems such as English, but are not known to be extensible to other language groups. The graphical systems are poorly adaptable to mobile phones with 12-key keypads which typically lack a touch screen interface.

The proposed solution Fill In The Blanks (FIBs) is designed not only to be simpler and more accurate, but also extensible to other writing systems, and adaptable and portable to diverse hardware platforms.

The main idea is based on the general assumption that standardized languages comprise composite structures such as words which in turn comprises a finite number of basic elements such as characters. The basic elements making up the composite structures are assembled and interpreted according to a given set of rules specific to a language. For example, in English, characters are positioned (assembled) linearly to form words, which are in turn separated by one or more delimiters in phrases (strings), and read from left to right.

A partial template that can match a finite number of complete composite structures is used to query the possible matches to the template from a data source. A specific type of element is designated as a blank cue (wild card) which can represent a finite number of basic elements, while a non-blank cue normally represents a valid basic element. The template will typically have a number of cues, a mix of blank and non-blank cues.

The method to specify the exact number of cues or basic elements in the template (partial composite structure) does not require any scripting or command line input, making it highly practical for mobile applications. A cue in the template can be pointed to by a pointer or a caret and edited to refine the template.

A primary component of the concept is a close ended template which can only have a finite number of matches, in contrast to the currently available methods which employ an open ended template which can have an infinite number of matches, when applied to a hypothetical infinite data source. The partial template for English language has some missing characters represented by blank cues, but constrained by the exact number of characters in the word sought. It is editable making it possible to accurately focus in onto any part of the word to refine the query for the desired match.

The use of discrete instead of continuous signals makes FIBs highly portable and adaptable. For example, even though the preferred embodiment is implemented on a QWERTY based keyboard, it can be ported to work equally well on other keyboard layouts such as DVORAK. While the preferred embodiment is illustrated on a tablet PC with a touch screen, it can be adapted to work on a diverse set of hardware platforms such as, mobile devices with physical keyboards or touch screens, and mobile phones with 12-key keypads.

ADVANTAGES

The advantages over the approaches taken by the competing word completing systems that may be present in one or more of the embodiments may include but are not limited to determinism, greater simplicity, and higher accuracy.

The most commonly used approach in word completion is word prediction. Word prediction relies on the first few characters typed to predict the desired word to be entered. However, unless restricted by subjective measures such as meaningful words or context sensitive criteria, the raw number of possible combinations and permutations of characters beginning with a certain character is infinite.

An emerging approach is to use the swiping gestures across keys on an onscreen keyboard to formulate the desired word to be entered. Similarly, unless restricted by subjective measures such as a certain keyboard layout, potential gestures and context sensitive criteria, the raw number of possible combinations and permutations of words resulting from the variation in keyboard layout and gestures is infinite.

The proposed invention applies a deterministic approach which has clear advantages over the non-deterministic approaches described above. The proposed invention adapts the age old word completion method fill-in-the-blanks to modern word processing. At the minimum, this approach provides the exact number of characters that are in the word to be completed. By fine tuning the individual cues, place holders such as blanks or characters in the cue strip, the template made up of cues, the number of potentially compatible words (or strings of words for a template chain) can be substantially narrowed down even before any other criteria is applied.

The deterministic approach which returns a finite result set coupled with a convenient and intuitive input mechanism could potentially serve as a foundation for a simpler, more accurate, and faster solution to word completion.

SUMMARY

The proposed invention, Fill in the Blanks Word Completion System (FIBs), describes a deterministic approach to word completion. The system comprises a display component, an input device, and a collection of hardware and software subsystems (not shown) in communication with a data source, and relevant components.

The input device tracks the movements of an object in a spatial medium where the information is processed for further interpretation. The software subsystem comprises instructions to interpret the movements of the object, provide a template, retrieve data and complete a target composite structure. Further, the template represents a partial composite structure, comprising of cues representing a finite number of basic elements, conforming to a set of rules specific to a given writing system. The exact number of elements or cues in the template can be indicated by a designated signal, keying in a number, or a gesture.

The template, which can be accurately edited, is used to retrieve a fill list, a set of potential matches from a data source. As the template is modified the fill list is updated in real time, following a pause or a delay, at the occurrence of a designated signal, in coordination with a gesture, or by a certain criteria. It can be further restricted by applying context sensitive or custom criteria.

Adapting this approach for English language where a word is a composite structure composed of characters would result in a template containing a cue strip, with cues structured linearly and read from left to right, defining the outline of a word to generate a fill list, or a series of templates for a chain of words (text string). The fill list can also be further restricted by proper or meaningful English words, words in the database, or a certain criteria.

DRAWINGS—LIST OF FIGURES OF PREFERRED EMBODIMENT

DRAWINGS—LIST OF REFERENCE NUMERALS

0 Contact point
3 Regular onscreen keyboard
5 FIBs system layout
5M Mode indicator
5Q Cue
5S Cue strip
5C Caret
5H Highlight bar
5L Fill list
5W Word to be completed
6 FIBs input system
6C Caret navigation row
6S Cue strip manipulation row
6T Token manipulation row
6L Alphabetically ordered selector control
6I ASCII ordered selector control
6V Vowel selector control
6A Add word to database control
6D Delete word from database control
6M Modify selected word control
6W Select entry from fill list control

DESCRIPTION—PREFERRED EMBODIMENT

Figure 1:
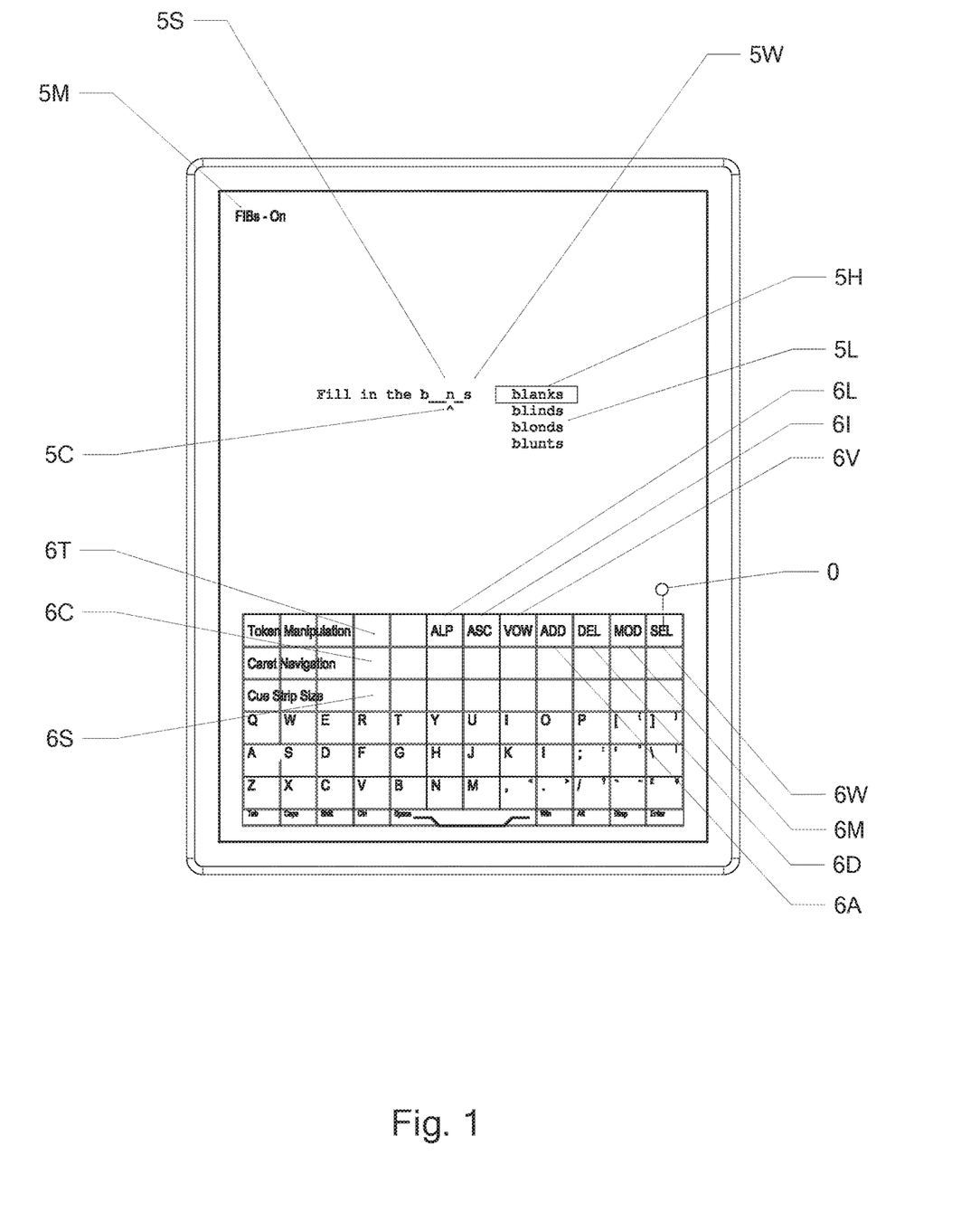
FIG. 1 is the structure of the system on an electronic device

FIG. 1 shows the structure of the FIBs system on a tablet PC with a touch screen. Subsystems including a software component (not shown) manage the operational aspects of the system. The traversal of the contact point 0, the point of engagement of an object with the touch screen, over designated boundaries triggers relevant functions of the system.

The system supports functions to manipulate the cue strip and the cues, such as changing the size of the cue strip, navigating a caret insertion pointer along the cue strip, and modifying a cue by a variety of criteria. Further more, the system also supports the generation and manipulation of the fills, i.e. entries in a fill list, such as selecting, arranging, adding, deleting or modifying, and other custom functions.

To simplify the illustration, the system described generates the result set or fill list in real time to reflect the current state of the cue strip, and the figures illustrate the state of the system at a given moment.

The mode indicator 5M displays the current state of the FIBs system. The word to be completed 5W is represented by a cue strip 5S, and the caret 5C is pointed at a cue which can be manipulated by functions on the token manipulation row 6T, where a token is an element of interest. The fill list 5L contains a generated list of entries that are potential matches to fill in the blanks.

The cue strip manipulation row 6S is for changing the size of the cue strip 5S where moving the contact point to the left or right traversing a designated vertical boundary respectively decreases or increases the size of the cue strip 5S. When the caret is pointing at the cue at the end of the cue strip (not shown) and the user drags the contact point right to increase the size of the cue strip, the system can be programmed to push the last cue to the right inserting blank cues " " to its left, i.e. in front of it, or leave the last cue pointed to by the caret in the same position and add blank cues to its right. The size of the cue strip can also be modified by indication of a number. Similar measures can also be applied in decreasing the size of the cue strip.

The caret navigation row 6C is for moving the caret 5C along the cue strip 5S. Moving the contact point to the left or right traversing a designated vertical boundary on this row moves the caret 5C one cue in the respective direction within the bounds of the cue strip 5S.

The token manipulation row 6T is for manipulating a cue pointed by the caret 5C or an entry in the list of entries in the fill list 5L. Traversing the contact point 0 over a designated boundary, e.g. top or bottom boundary of a certain region modifies the respective element in the corresponding direction in accordance with the programmed rules. For example, traversing the contact point 0 upwards over the top boundary of the select entry from fill list control 6W would move the highlight bar 5H one position up in the fill list 5L.

Similarly, swiping upwards or downwards across a designated boundary, e.g. the top or bottom boundary, of the region marked "ALP" for alphabetically ordered selector control 6L, changes the cue pointed by the caret 5C to the respective preceding or succeeding alphabet. A similar action executed on the region marked "ASC" for ASCII ordered selector control 6I changes the corresponding cue to the respective ASCII ordered cue. Vowel selector control 6V marked "VOW" also changes the corresponding cue to the respective vowel in the sequence in a similar manner. The region marked "ADD" 6A is the control to add a word to the database, the region marked "DEL" 6D is the control to delete a word from the database, the region marked "MOD" 6M is the control to modify the currently selected entry from the fill list 5L, and the region marked "SEL" 6W is the entry selector control to select an entry from the fill list 5L.

Operation—Preferred Embodiment

Figure 2:
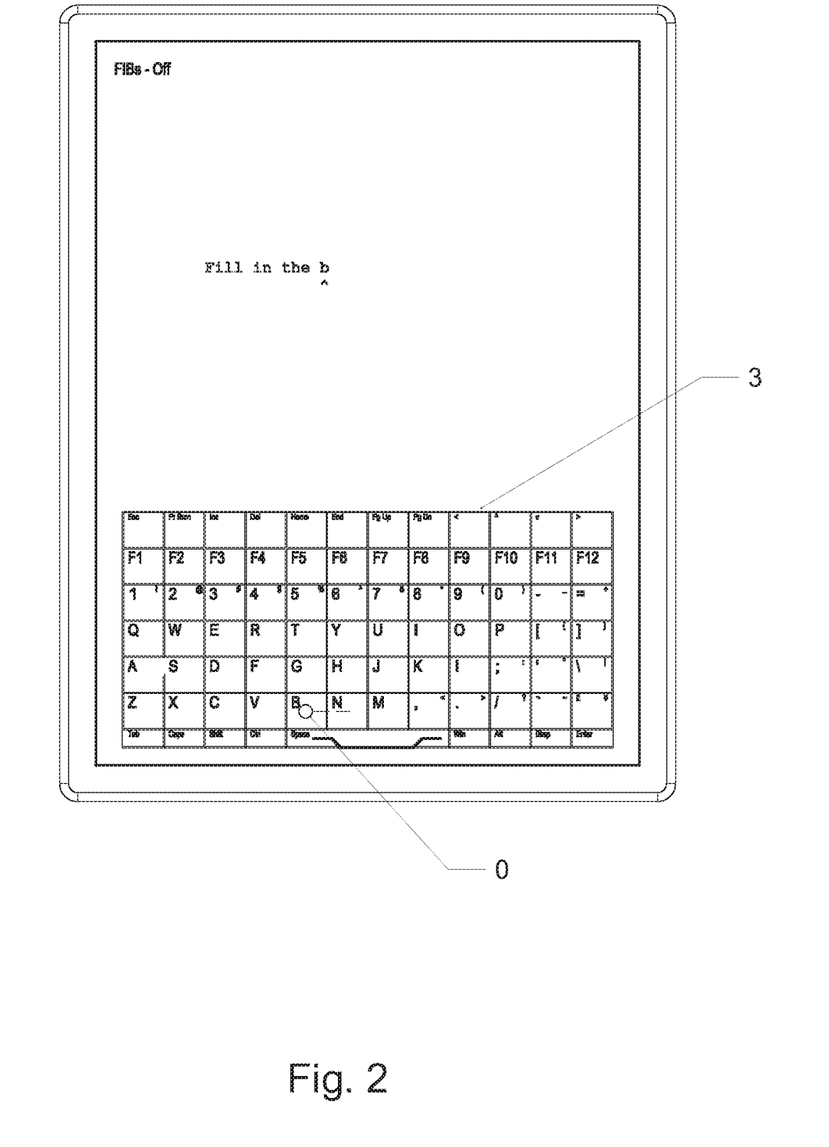
FIG. 2 is transition from a regular onscreen keyboard

FIG. 2 shows the transition from a regular onscreen keyboard 3 to the FIBs system layout (not shown). The user types in the letter "b" in a regular fashion, and touches down again and makes a horizontal movement of the contact point 0 traversing a designated vertical boundary which activates the FIBs mode.

Figure 3:
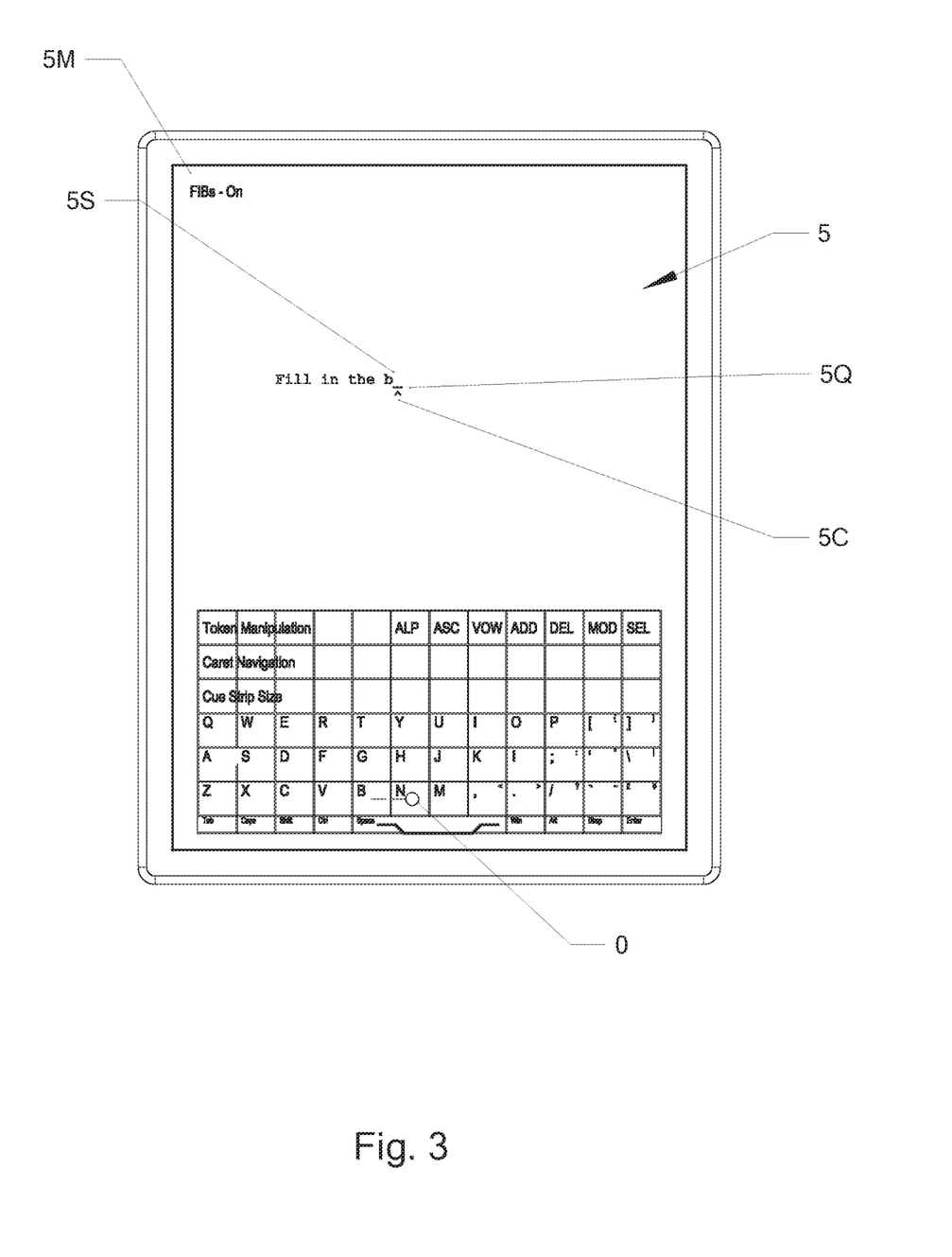
FIG. 3 is the transition to the FIBs keyboard layout

FIG. 3 shows the transition to the FIBs system layout 5 and FIBs input system 6 following the traversal of contact point 0 over a designated vertical boundary. The mode indicator 5M shows the current state of the FIBs system. The caret 5C is pointing to the second blank cue 5Q, the most basic type of cue, in the cue strip 5S.

Figure 4:
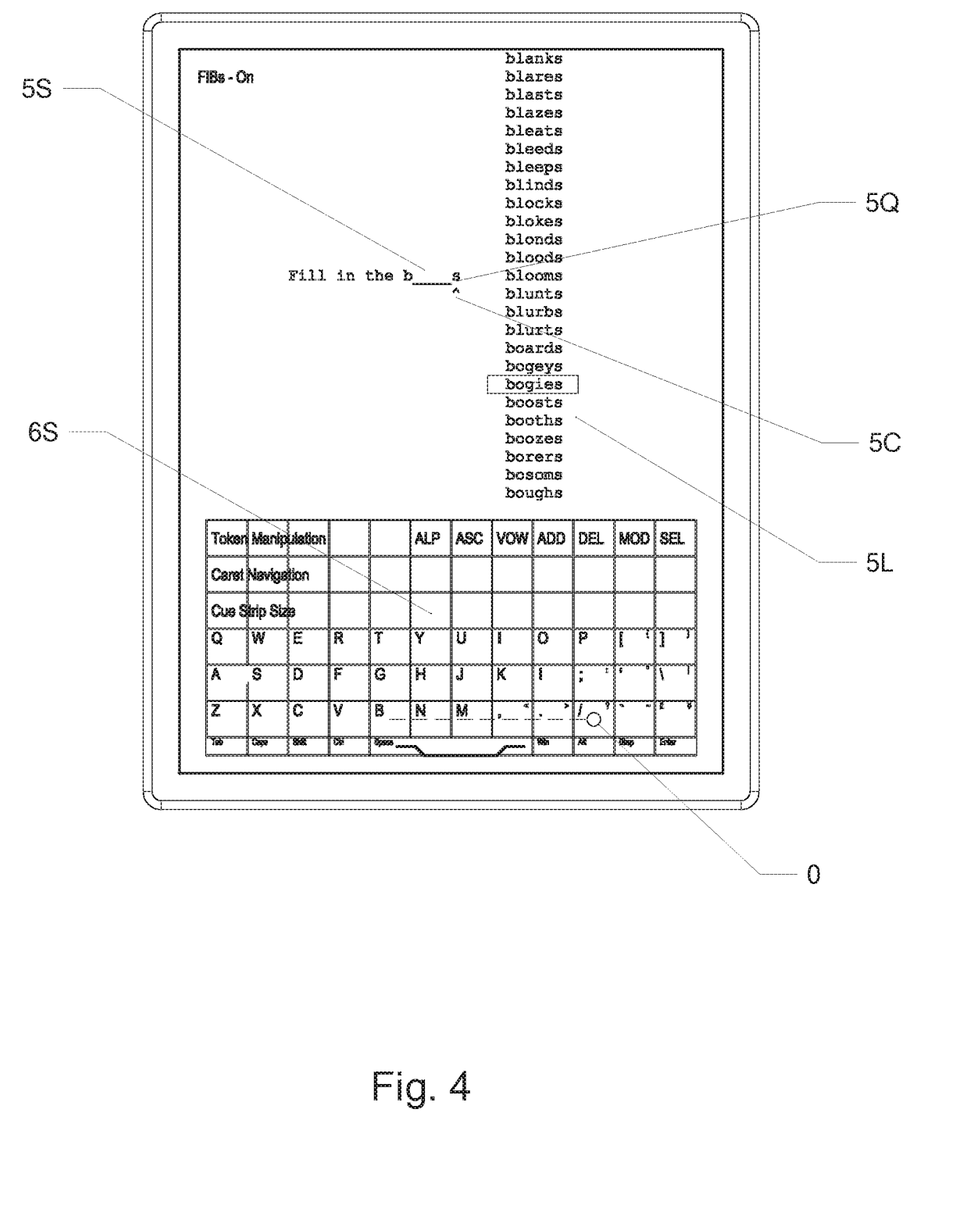
FIG. 4 is the creation of the cue strip

FIG. 4 shows the creation of, a partial template, a cue strip 5S. As the contact point 0 is moved further to the right traversing more designated vertical boundaries the cue strip becomes "b______" with the caret 5C pointing to the last created cue 5Q. While the FIBs mode is active, moving the contact point 0 across a designated vertical boundary on the cue strip manipulation row 6S left or right would respectively decrease or increase the size of the cue strip 5S by one cue. The caret 5C can be programmed to point to a specific cue after the change in the size of the cue strip 5S.

The figure shows the state after the user disengages with the touch screen following the creation of the cue strip "b______" and again types in the letter "s" to create the cue strip "b______s" 5S with four blank cues in between "b" and "s" where the fill list 5L containing words matching the cue strip 5S is generated. It is possible to create a cue strip containing only six of the most basic cue "_" representing a blank cue strip "______" by simply dragging the contact point across six designated boundaries in a manner similar to what was illustrated in FIG. 2 without entering the letters "b" and "s". On its own, however, this could be of limited practical use.

Figure 5:
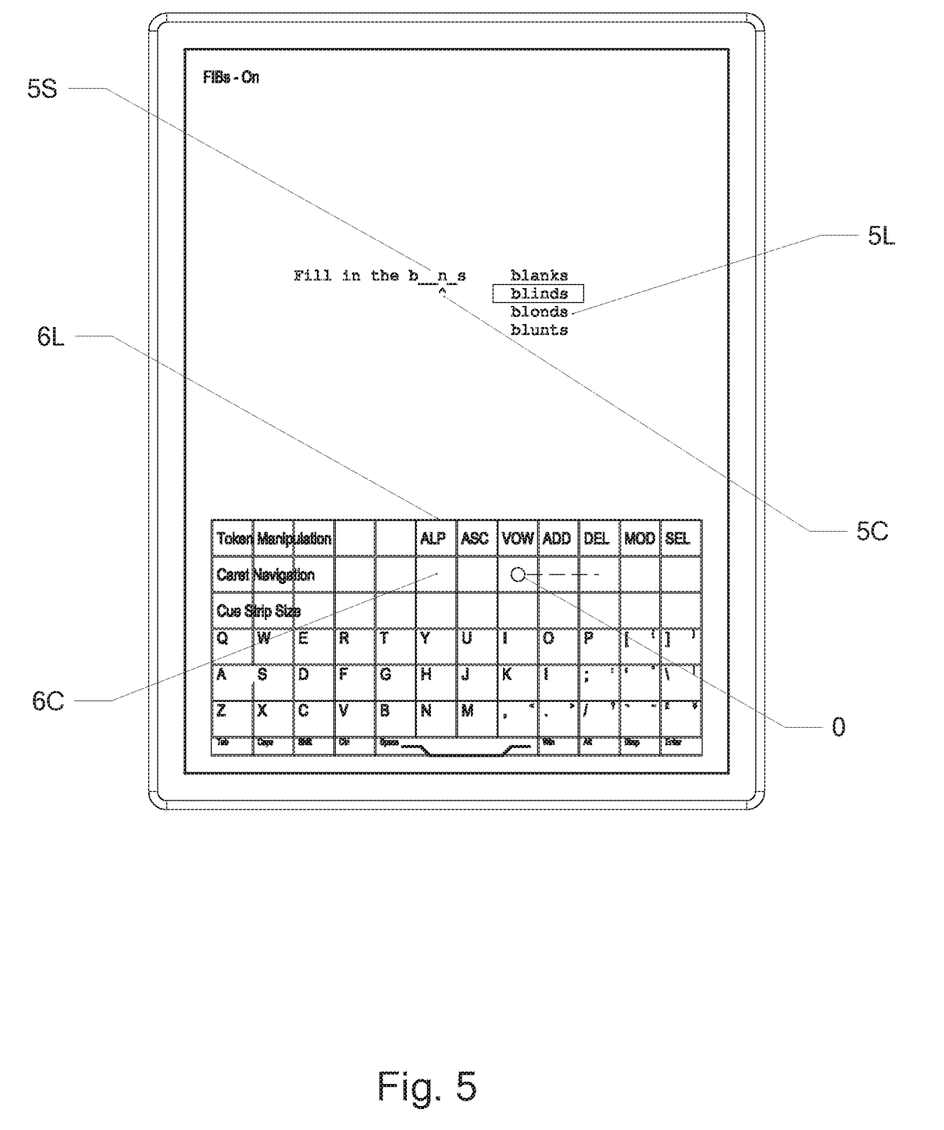
FIG. 5 is the manipulation of a cue

FIG. 5 shows the manipulation of a cue. Individual cues can be manipulated to further narrow the fill list 5L. In this illustration, the user drags the contact point 0 on caret navigation row 6C to the left traversing two designated vertical boundaries to move the caret 5C two positions left to point to the fourth cue "_". The fill list 5L is further narrowed down to a handful of entries after the user disengages with the touch screen and types in the letter "n".

While the caret 5C is pointing to the fourth cue "n" in the cue strip 5S, the user can also change the letter "n" to "m" by swiping upwards traversing the top boundary of the region designated as alphabetically ordered selector control 6L, or to "o" by swiping downwards traversing the bottom boundary of said region.

Figure 6:
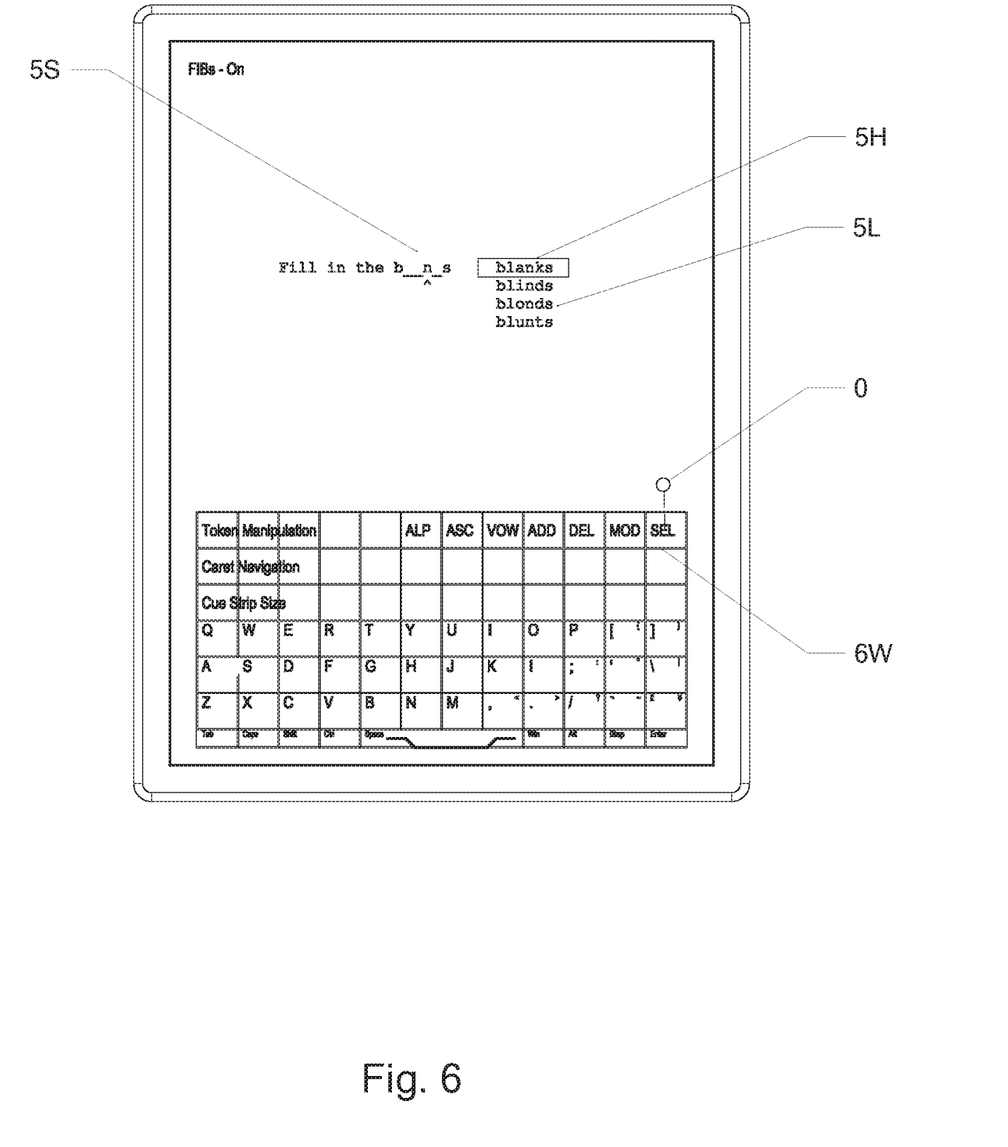
FIG. 6 is the completion of a word

FIG. 6 shows the completion of a word. Dragging the contact point 0 upwards to traverse the top boundary or downwards to traverse the bottom boundary of the select entry from fill list control 6W will position the highlight bar 5H over the entry in the fill list 5L in the corresponding direction. Selecting SEL (select entry) from fill list control 6W, or entering a designated signal or a delimiter indicating a word or string boundary, such as a "," (comma), "." (period), " " (space), "?" (question mark), a parenthesis ([({ })]), or a carriage return/new line character or character pair (enter) will replace the cue strip 5L with the highlighted entry, and deactivate the FIBs mode (not shown).

The system can be programmed to relax the constraint on a template or a template chain. This can be demonstrated in English language using words and sentences, but could also be extended to other languages or writing systems applying respective rules.

When the constraint on the exact number of cues in a template is relaxed, for instance, the template "b______k" that matches "blank" would also match the word "blanks".

When the constraint on the number of composite structures immediately following a certain template in a template chain comprising one or more templates is relaxed, for instance, the template chain "______ ______" that matches "fill blanks" would also match the string "fill in the blanks"

when the constraint on the first template is relaxed. The total size of the template chain can be described as the sum of the size of all templates, taking the delimiters into consideration as a factor, for example, a constant, parameter, variable, or function etc., where applicable.

CONCLUSION, RAMIFICATIONS AND SCOPE OF INVENTION

The reader will see that the present invention provides an inherently and algorithmically deterministic approach, which results in a finite number of permutations and/or combinations of matches to a partial template, to word completion which is simpler and more accurate than the non-deterministic approaches.

While the proposed invention is illustrated using English language which is a segmental (alphabetical) writing system, it can also be applied to non-English or non-segmental (non-alphabetical) writing systems including logographic (pictorial/pictographic) and syllabic writing systems comprising their own basic elements, delimiters, templates, and rules for assembling/interpreting composite structures or a chain of them. Where applicable or desired, the system can also be programmed to make the basic elements include a null element (character or value) which can also be represented by a cue, even though the illustrations presented do not show a cue representing one.

FIBs is designed to use a discrete input signal, for example, the number of vertical boundaries traversed or a number indicated, to specify the constraint of the exact number of cues in the template, to make it easily portable to other hardware platforms such as conventional mobile phones that are equipped with a 12-key key pad, but lack a touch screen to receive continuous signals such as graphical input or gesture strokes.

The proposed solution achieves the desired results in a highly interactive approach without the need of a command line input or a scripting language, although elements of these could be applied to extend its capability. For example, special cues could be designed to represent specific combinations of elements of regular expressions or some scripting language, and special keys or combinations of keys could be designated to indicate a special cue or a signal.

Controls similar to "ALP" 6L or "ASC" 6I (FIG. 1) can be implemented to relax the constraint(s) on the template or template chain to allow an infinite (in theory) result set, or by the designation of a special position or state of the pointer (caret). For example, by moving the pointer outside the bounds of the template or template chain, or by creating a state where the pointer has not selected any cue in the template, or a template or a delimiter for the template chain, where the system relaxes the constraint on receipt of a designated signal and vice versa.

Further more, variations, modifications and extensions can be applied to the system without departing from the spirit of the invention, for example:

- by applying to fundamentally different types of writing systems or languages such as computer programming, aviation, navigation and emergency response;
- by using different types of cues based on alternative gestures based on audio signals, facial expressions or bodily movements;
- by using other sensing methods such as optical, thermal or chemical, and other types of spatial mediums;
- by using more or less regions or boundaries, and different configurations; and interpretation of the movements of the tracked object in alternative directions.

While the above description contains many specifications, these should not be construed as a limitation of the scope of the invention, but rather as an exemplification of a few embodiments thereof.

What is claimed is:

1. A template system for a writing system for querying from a data source comprising:
   a) zero, one or more non-blank cues that represent one or more valid basic elements of said writing system and therefore represent for searching purposes of one or more specified basic elements of said writing system;
   b) zero, one or more blank cues wherein a blank cue represents a basic element from a finite number of said one or more basic elements and therefore represent for searching purposes of one or more unspecified basic elements of said writing system;
   c) a template chain comprising one or more user-editable searching templates wherein each template comprises an exact cardinal number of a combination of said zero, one or more blank cues and zero, one or more non-blank cues, the specific number and composition of such cues being editable by a user over a user interface;
   d) a processor, a collection of software and hardware subsystems, in communication with said user-editable searching template, the user interface, and said data source; and
   e) one or more instructions defined within said processor, wherein said one or more instructions is configured to retrieve a result set, a set of matches to the user-editable searching templates which set of matches match the specific number and composition of blank cues and non-blank cues of the user-editable searching templates, from said data source.

2. The template system of claim 1, wherein the cues do not represent a null element.

3. The template system of claim 2, wherein the basic elements do not include a null element.

4. The template system of claim 1, wherein the maximum size of each match is bounded by the total size of the user-editable searching template.

5. The template system of claim 1, wherein said result set is a finite set of matches.

6. The template system of claim 1, wherein an entry from the list of matches can be selected by entering a delimiter.

7. The template system of claim 1, wherein the list of matches can be altered in real-time.

8. The template system of claim 1, wherein the constraint to limit said template chain to entail a finite number of matches can be relaxed.

9. The template system of claim 8, wherein the constraint can be relaxed by entering a state where the pointer has not selected a template or a delimiter in the template chain.

10. The template system of claim 9, wherein the state to relax the constraint is entered by moving the pointer outside the bounds of the template chain.

11. The template system of claim 1, wherein the constraint to limit a template to entail a finite number of matches can be relaxed.

12. The template system of claim 11, wherein the constraint can be relaxed by entering a state where the pointer has not selected any cue in the template.

13. The template system of claim 12, wherein the state to relax the constraint is entered by moving the pointer outside the bounds of the template.

14. The template system of claim 1, wherein said user interface further comprising an input device, and the user-editable searching template is implemented on the same medium as the input device.

15. The template system of claim 14, wherein the input device and the user-editable searching template are implemented on a touch screen.

16. The template system of claim 15, wherein said one or more instructions are configured to respond in a substantially interactive manner.

17. The template system of claim 16 is devoid of a command line.

18. The template system of claim 16 is devoid of a scripting language.

19. A non-transitory computer readable medium encoded with computer readable instructions for a template system for a writing system for querying from a data source, comprising instructions for:
   a) providing zero, one or more non-blank cues that represent one or more valid basic elements of said writing system and therefore represent for searching purposes of one or more specified basic elements of said writing system;
   b) providing zero, one or more blank cues wherein a blank cue represents a basic element from a finite number of said one or more basic elements and therefore represent for searching purposes one or more unspecified basic elements of said writing system; and
   c) providing a template chain comprising one or more user-editable searching templates that, comprises an exact cardinal number of a combination of said zero, one or more blank cues and zero, one or more non-blank cues, the specific number and composition of such cues being editable by a user over a user interface, wherein said computer readable instructions are configured to retrieve a result set, a set of matches to the user-editable searching templates which set of matches match the specific number and composition of blank cues and non-blank cues of the user-editable searching templates, from said data source.

20. The non-transitory computer readable medium encoded with computer readable instructions for a template system in claim 19, wherein said computer readable instructions are configured to respond in a substantially interactive manner.

* * * * *